April 4, 1939.  F. E. KITE ET AL  2,152,765
TIRE RETREADING APPARATUS
Filed Sept. 23, 1935
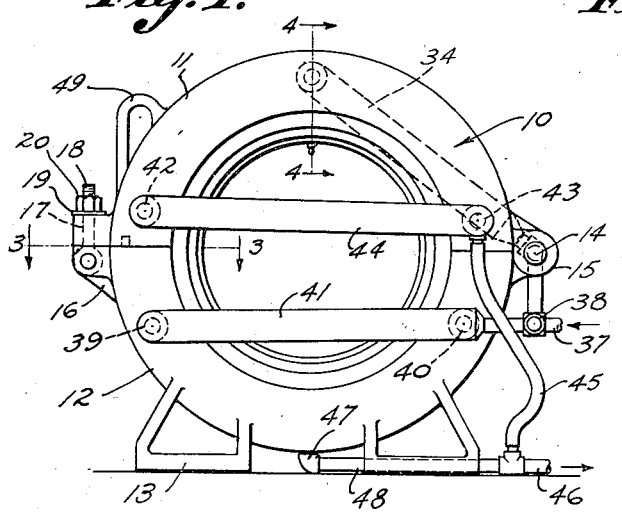
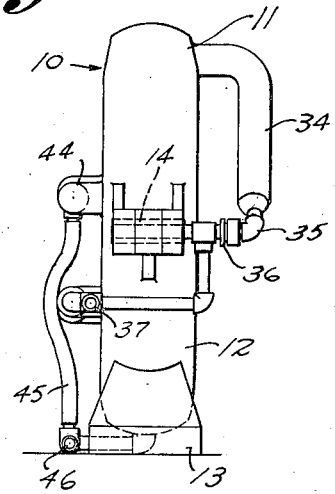
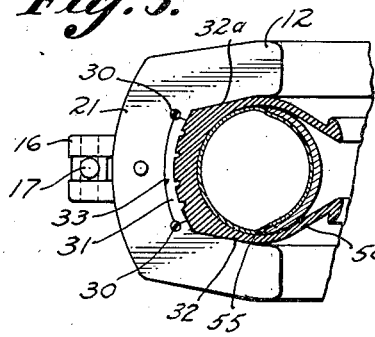
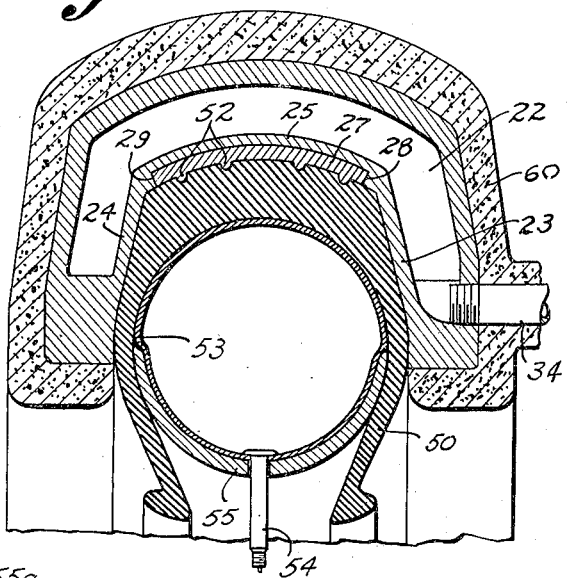
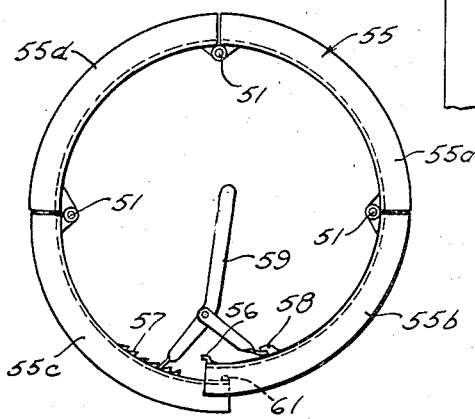
INVENTORS.
Floyd E. Kite,
BY Lawrence B. Broering,
Robert W. Fulwider
ATTORNEY.

Patented Apr. 4, 1939

2,152,765

UNITED STATES PATENT OFFICE 2,152,765

TIRE RETREADING APPARATUS

Floyd E. Kite and Lawrence B. Broering, Los Angeles County, Calif., assignors, by mesne assignments, to Tru-Tred, Inc., a corporation of California Application September 23, 1935, Serial No. 41,740

2 Claims. (Cl. 18—18)

Our invention relates broadly to an apparatus for retreading pneumatic tires, and particularly to the type employing what is known in the art as a full circle mold. In the art of retreading tires, an important problem has always been to secure uniform and complete contact between the carcass or casing, and the rubber or other material being applied to form the new tread, while said tread material is being cured. Various means of accomplishing this purpose have been offered to the trade, but most of them have not found favor because in accomplishing their objective they have found it necessary to put an abnormal strain on the sidewalls and bead of the carcass.

It is a major object of our invention to provide a full circle mold apparatus in which a tire carcass can be retreaded without any undue strain being placed on the sidewalls and bead, while at the same time a complete and uniform pressure contact is maintained between the carcass and the retreading material during the entire time of curing. It is another object of our invention to provide a tire retreading mold in which tires of various sizes can be treated without modifying the shape or size of the mold itself.

A further object of our invention is to provide a fluid circulating system which will give maximum heating efficiency from the steam or other curing fluid used and which is also simple and economical in construction and operation.

It is also an object of our invention to provide a segmental collapsible ring or floating rim which follows the curing tube inside the casing thus eliminating pressure on the sidewalls and bead. By using our floating rim in conjunction with a mold of the shape hereinafter described, it is possible to prevent heat from the fluid cavity affecting the sidewalls of the tire.

Practically all retreading molds have either been of the side opening or clam shell type in which each segment is a complete circle, or of the end opening or segmental type in which the full circle is composed of hinged segments. The end opening type of mold has never been popular in the trade because of the difficulty heretofore experienced in providing a satisfactory fluid system and means for preventing strain and heating of the side walls and bead.

It is the purpose of our invention to provide an end opening or segmental type of retreading mold which overcomes the difficulties just mentioned and accomplishes the foregoing objects and other objects and advantages, as will become readily apparent from the following description of a preferred form of our invention and from the accompanying drawing in which:

Fig. I is a side elevation of a preferred form of our device.

Fig. II is an end elevation of the same.

Fig. III is a horizontal fragmentary section taken at 3—3 in Fig. I.

Fig. IV is an enlarged vertical fragmentary section taken at 4—4 in Fig. I.

Fig. V is a side elevation of our segmental rim.

Referring to the drawing and particularly to Fig. I thereof, the numeral 10 indicates generally a full circle tire retreading mold comprising upper and lower segments 11 and 12 respectively. In the preferred form illustrated, the mold 10 is supported in a vertical position by a base 13, formed with or fastened to the lower mold segment 12 by any convenient means. The upper mold segment 11 is swingable in a vertical plane and pivotally connected to lower segment 12 by means of a hinge 14 supported in a boss 15 on one side of lower segment 12 and immediately adjacent the line of juncture between the upper and lower mold segments. On the external face of lower segment 12 on the side opposite the hinge 14 is a boss 16 in which is pivotally mounted a latch member 17 with a threaded end 18. The latch member 17 is adapted to swing into a bifurcated boss 19 carried by upper segment 11 and disposed so as to be immediately opposed to boss 16 when the segments are in closed position. A nut 20 may be provided on the threaded end of bolt 17 to clamp upper segment 11 down into tight engagement with lower segment 12 when the mold is closed and latch member 17 is inserted in the bifurcated boss 19.

The lower mold segment 12 is provided with an annular fluid cavity 21 as shown best in Fig. 3, said cavity extending the entire circumferential length of segment 12, but being completely closed on all faces except for inlet and outlet openings as hereinafter described. The upper segment 11 is provided with a similar fluid cavity 22 with appropriate openings as hereinafter described. As will be seen best from the enlarged section in Fig. 4, the upper mold segment 11 is in the form of a shell of curved cross-section providing the fluid cavity 22 previously mentioned and a molding cavity for receiving a tire 50. The outer surface of the shell is preferably covered with a jacket 60 of asbestos or other heat insulating material for economy of operation. The inside or molding face of this shell is formed of two relatively straight side wall sections 23 and 24, and a curved center section 25 to form a complete closure for the fluid cavity 22.

The center section 25 is recessed on its concave face to accommodate a semicircular tread mold plate 27 of curved cross-section corresponding to that of center section 25. The shoulders of the recess and the corresponding edges 28 and 29 of tread plate 27 are cut on an angle so that the tread plate is prevented from moving laterally, although it is slidable circumferentially and is placed in position by inserting one end thereof in one end of the recess and sliding it around the recess until its ends are flush with the ends of the segment 12. The tread plate may be secured in position against circumferential movement by any convenient means such as countersunk screws 30 in the ends of the fluid cavity shell, which overlap the tread plate as shown in Fig. 3 wherein a tread plate 31 in lower segment 12 is illustrated. As previously mentioned the fluid cavity 21 is in all respects similar to cavity 22 and its shell is provided with sidewall sections 32 and 32a and a center section 33 similar to the upper shell just described in detail. In accordance with usual practice the concave face of tread plates 27 and 31 may be provided with suitable corrugations or projections 52 to form a desired tread design on the tire 50. It will be understood, of course, that the tread plates 27 and 31 may themselves form the center section closure between sidewall sections 23 and 24, and may be removable or not as desired.

In our preferred form as best seen from Figs. 1 and 2, the upper mold segment 11 is provided with a fluid inlet pipe 34 adapted to provide steam or other heating fluid to the upper portion of cavity 22. The other end of inlet pipe 34 terminates in an L 35 which in turn connects with a swivel union or swing joint 36 mounted on boss 15 coaxially with hinge 14 in such a manner that when the upper segment 11 is rotated about the hinge 14, the inlet pipe 34, the upper end of which is integral with the upper portion of segment 11, will likewise rotate about the same axis. The swivel union 36 may be connected to a main inlet pipe 37 as by T 38. The lower segment fluid cavity 21 is provided with two fluid inlet openings 39 and 40, preferably spaced opposite each other and relatively well up on the opposite sides of the segment and near its upper ends. A header pipe 41 feeds the inlets 39 and 40 by appropriate connections, its open end being connected to main inlet 37 by the T 38. The inlet 40 is preferably positioned a little above inlet 39 to allow any condensate in header 41 to drain through inlet 39 into fluid cavity 21.

The upper segment 11 is provided with a pair of outlet openings 42 and 43, connected to an outlet or drain pipe 44 which in turn feeds into an outlet hose 45 and down to a main outlet 46. Outlet 43 may be located slightly lower than outlet 42 to allow free flow in drain pipe 44 of condensate from the fluid cavity 22. If desired, instead of employing an outlet hose 45, the drain pipe 44 may be swivelly connected in any convenient manner such for example as that described and shown for the inlet pipe 34. An outlet or drain 47 may be provided in the bottom of lower segment 12 opening into a drain pipe 48 connected to main outlet 46. For convenience in raising and lowering the upper segment 11 about the hinge 14, a handle 49 may be provided on the outside of segment 11 adjacent the boss 19.

In operation the outer surface of the carcass of the tire to be retreaded is covered with a layer of raw rubber or other material which is to form the new tread thereon and the tire is placed in the mold segment 12. The upper segment 11 is lowered into position and clamped by means of the latch 17 and nut 20. As will be noted from Figs. 3 and 4, the shell wall sections 23 and 24 of the upper segment, and 32 and 32a of the lower segment together with their respective tread plates 25 and 31, form a mold of the desired shape for the tire 50. It will also be noted that the respective side wall sections of the shells of segments 11 and 12 terminate about half way up the side walls of the tire so as to leave the lower portion of the tire walls and the bead unconfined by the mold. The exact point of termination of the mold sidewalls of course may be varied, but in general it is advisable to have as little of the tire confined in the mold as possible.

An airbag 53 with a valve 54 is inserted in the casing prior to the same being placed in the mold, the air bag being inflated just enough to support and properly position a curved ring or floating rim 55 which in the preferred form illustrated comprises four segments of a circle 55a, 55b, 55c and 55d. As will be noted from Fig. 5, segment a is hinged to segments b and d, and segment d is hinged to segment c, the hinges all being designated by the numeral 51. One end of segment 55b is provided with an upstanding shouldered lug 56, adapted to engage the opposing end of segment 55c, which may, if desired, be provided with a recessed plate 61 to accommodate the lug 56. On the convex face of segment 55c and disposed adjacent to the free end thereof, is a notched rack 57. Spaced back from the lug 56 a short distance along the inside circumference of segment 55b is a second upstanding lug 58. By using an appropriate wedging or spreading means such as illustrated at 59 and placing one end thereof against lug 58 and the other end in progressive notches of the rack 57, the segments 55b and 55c can be spread apart so as to allow their ends to abut and the lug 56 to engage the free end of segment 55c to provide a circular rim. The rim 55 is provided with an opening suitably positioned to allow the valve 54 of air bag 53 to protrude therethrough.

When the assembled tire carcass, airbag and floating rim are inserted in the mold and the latter is clamped in closed position as previously described, the airbag is further inflated to the pressure required to cause the tread portion of the carcass and the small portion of the sidewall thereof which is confined by the mold sidewalls, to press firmly and uniformly against the inside of the mold 10 and particularly against the tread plate 27.

By making the rim 55 of curved cross-section and preferably as a semicircle, the same is allowed to hold the airbag firmly in position preventing it from expanding towards its center so that any expansion must be against the carcass to force the same against the mold.

As will be noted from Figs. 3 and 4, the rim 55 and mold sidewalls 23 and 24 and 32 and 32a respectively are so proportioned and related that the upper (in Fig. 4) edges of the rim 55 substantially coincide with the lower (in Fig. 4) ends or edges of mold sidewalls 23 and 24 so that the airbag only presses against the tire 50 where it is supported by the mold. Thus it will be seen that no lateral strain whatsoever is placed on the tire walls. Furthermore, adequate clearance is left between rim 55 and the mold walls 23 and 24 to allow the tire walls to move freely therebetween so that the lower portions of the tire walls may readily adjust themselves as pressure is increased in the airbag 53 and the tread of the tire is forced into intimate contact with tread plate 27.

A floating rim such as just described is essential for the successful operation of an end opening or segmental mold for with the conventional type of rim or supporting ring a terrific strain is placed on the side walls and bead of the tire often causing a failure thereof. Furthermore, by using a deep rim of this type the mold can be made with relatively short sidewalls which allows the curing heat to be applied to the tread portions of the tire without affecting the sidewalls detrimentally. As will be readily apparent the use of a floating rim with plenty of clearance between it and the mold walls gives the retreading apparatus an adjustability impossible to secure in segmental molds using solid or fixed rims, for by leaving the lower part of the tire walls and the beads unconfined tires of different sizes may be retreaded in the same mold.

One of the advantages of an end opening or segmental mold with short sidewalls as herein described over the clam shell type resides in the fact that in opening the segmental mold to remove the cured tire the mold is easily pulled away from the tire without interference therewith, whereas the clam shell variety does not break free without wedging the tire.

While we have shown and described a preferred form of our invention, it is to be understood that we are not to be limited to the precise shape and arrangement of parts which are merely illustrative of the basic principles involved in our invention as defined by the appended claims.

We claim:

1. In a tire retreading apparatus, a full circle mold formed of upper and lower segments each having a steam cavity extending substantially throughout the length of the segment, said upper segment having a steam inlet into the upper portion of its cavity and further having a pair of steam outlets from the lower portions of its cavity, one of said outlets being lower than the other, said lower segment having a steam outlet from the lower portion of its cavity and further having a pair of steam inlets into the upper portions of its cavity, one of said inlets being higher than the other, an inclined discharge pipe connecting the upper segment cavity outlets, an inclined supply pipe connecting the lower segment cavity inlets, steam distributing means adapted for connection with a source of steam supply and connected with the inlet of the upper segment cavity and with the higher end of the inclined supply pipe connecting the lower segment cavity inlets, and exhaust steam receiving means adapted for connection with a steam discharge conduit and connected with the lower segment cavity outlet and with the lower end of the discharge pipe connecting the upper segment cavity outlets.

2. In a tire retreading apparatus, a full circle mold formed of upper and lower segments each having a steam cavity extending substantially throughout the length of the segment, said upper segment having a steam inlet into the upper portion of its cavity and further having a pair of steam outlets from the lower portions of its cavity, said lower segment having a steam outlet from the lower portion of its cavity and further having a pair of steam inlets into the upper portions of its cavity, steam distributing means mounted on the mold and adapted for connection with a source of steam supply, means externally of the mold segments for connecting said steam distributing means with the inlets into said cavities, exhaust steam receiving means mounted on the mold and adapted for connection with a steam discharge conduit, and means externally of the mold segments for connecting said exhaust steam receiving means with the outlets from said cavities.

FLOYD E. KITE.
LAWRENCE B. BROERING.